(12) United States Patent
Balk

(10) Patent No.: US 8,480,788 B2
(45) Date of Patent: Jul. 9, 2013

(54) METHOD OF BYPASSING A PIPELINE IN A MULTIPLE PIPELINE SYSTEM

(75) Inventor: Wilhelmus Hendrikus Johannes Balk, Woking (GB)

(73) Assignee: Shell Oil Company, Houston, TX (US)

( * ) Notice: Subject to any disclaimer, the term of this patent is extended or adjusted under 35 U.S.C. 154(b) by 358 days.

(21) Appl. No.: 12/989,675

(22) PCT Filed: Apr. 24, 2009

(86) PCT No.: PCT/EP2009/054949
§ 371 (c)(1),
(2), (4) Date: Nov. 15, 2010

(87) PCT Pub. No.: WO2009/133027
PCT Pub. Date: Nov. 5, 2009

(65) Prior Publication Data
US 2011/0061739 A1 Mar. 17, 2011

(30) Foreign Application Priority Data
Apr. 28, 2008 (EP) .................................. 08155291

(51) Int. Cl.
*B01D 53/00* (2006.01)
(52) U.S. Cl.
USPC ........................ 95/39; 15/3.51; 15/104.062
(58) Field of Classification Search
USPC ............... 137/15.07; 15/3.51, 104.062; 95/39
See application file for complete search history.

(56) References Cited

U.S. PATENT DOCUMENTS

| 3,252,439 | A | | 5/1966 | Shatto et al. | 114/5 |
| 4,574,830 | A | * | 3/1986 | Rickey et al. | 137/242 |
| 4,736,482 | A | * | 4/1988 | Lankston | 15/104.062 |
| 5,232,475 | A | | 8/1993 | Jepson | 55/36 |
| 5,288,312 | A | | 2/1994 | Payne et al. | 96/158 |
| 6,129,150 | A | | 10/2000 | Lima | 166/357 |
| 6,336,238 | B1 | * | 1/2002 | Tarlton | 15/3.5 |

FOREIGN PATENT DOCUMENTS

| DE | 10310002 | 9/2004 |
| EP | 254503 | 1/1988 |
| EP | 331295 | 9/1989 |
| GB | 451905 | 8/1936 |
| WO | WO03067146 | 8/2003 |
| WO | WO2005040670 | 5/2005 |
| WO | WO2007060228 | 5/2007 |

* cited by examiner

*Primary Examiner* — Robert A Hopkins

(57) ABSTRACT

The present invention relates to an apparatus and method of producing gaseous and liquid component streams from at least two multi-phase streams in at least two pipelines, the method comprising at least the steps of:
(a) passing a first multi-phase stream along a first pipeline and through a first slugcatcher system;
(b) passing a second multi-phase stream through a second pipeline and a second slugcatcher system;
(c) passing a first pig down the first pipeline to create a first pig-slug mass in the first pipeline; and
(d) passing at least a fraction of the first multi-phase stream upstream of the first pig-slug mass to the second pipeline along a crossover line.

12 Claims, 2 Drawing Sheets

METHOD OF BYPASSING A PIPELINE IN A MULTIPLE PIPELINE SYSTEM

PRIORITY CLAIM

The present application claims priority to European Patent Application 08155291.1 filed 28 Apr. 2008.

FIELD OF THE INVENTION

This invention relates generally to a method of producing gaseous and liquid component streams from at least two multi-phase streams in at least two pipelines, and an apparatus therefor.

BACKGROUND OF THE INVENTION

In the field of oil production and transmission, flows of two-phase mixtures (e.g. gas-liquid mixtures) (hereinafter referred to as "multi-phase flows") or other mixtures of constituent parts having varying densities (e.g. liquid-liquid mixtures, gas-liquid mixtures, gas-gas mixtures) (hereinafter referred to as "mixture flows") are commonly encountered. This is especially true in production carrier pipelines conveying oil mixtures from a producing well. Producing wells, for example, may contain a mixture of oil, water and various gases that are extracted as a mixture flow through a pipeline. These flows must be received by oil handling systems and separated into constituent or component parts based on phase or density for treatment and subsequent distribution to end users.

It is often desirable for the separation of the components of a mixture, particularly those of different phases, to occur prior to the transmission thereof through significant lengths of pipelines. Early multi-phase or mixture flow separation enables mechanical devices functioning within oil production and transmission systems to manage component flows each having substantially only one phase or range of densities. Examples of such mechanical devices include compressors utilised for compressing materials in gaseous states and pumps for moving the flow of liquids. By managing component flow of a single phase or density range, these mechanical devices can be engineered for optimum performance while reducing stresses placed on respective oil handling systems. Thus, compressors are normally designed to handle gaseous streams and may be damaged by the presence of liquids. Similarly pumps are normally designed to handle liquid streams and may be damaged by the presence of gasses However, multi-phase and mixture flow separation may not be a simple matter. Firstly, many producing wells are positioned at remote locations and in harsh environments, such as on a deep sea floor. In those situations, achieving separate component part flows shortly after the corresponding multi-phase flow or mixture flow (especially two-phase flow) leaves the well requires a separator to be located where it is not easy to install nor easy to access when system maintenance is needed. Further, most conventional systems that achieve efficient component separation may be quite bulky and heavy, reducing the desirability of using such separation systems on offshore platforms where weight and space considerations are high priority.

In those situations where multi-phase or mixture flow separation is not possible at or near the well site, the oil, water and various gases that are extracted from the well must be transported along pipelines, sometimes over significant distances, before they can be treated.

A fluid flows along a pipeline as a result of the pressure difference between the upstream and downstream ends of the pipe. The flow of a two-phase gas-liquid mixture along a pipeline can lead to an uneven distribution of the components of the multi-phase mixture that interferes with the free flow of the gas and creates undesirable cyclic flow characteristics, referred to as a 'slug flow'. Slug flow can result in significant increases in pressure drop, and can become a limiting factor in maximising the length of a pipeline, the usable range of flow rate and the minimum delivery pressure of the pipeline.

Slugs can be formed in a number of ways. Liquid may be formed in a multi-phase or mixture flow by condensation as a result of a pressure drop across a well-head choke valve. In addition, multi-phase flow or mixture flow can experience frictional losses and heat losses to ambient temperature as it travels along the pipeline. These changes in the conditions can alter the equilibrium of the components in the pipeline, leading to for instance, gas condensate formation in a partially conditioned gaseous phase and gas flashing in a partially stabilised condensate phase, leading to so-called 'hydrodynamic slugging'.

Slugs may also be formed by other factors such as pipelines which have many changes in elevation. Liquid components can accumulate at the low points of the upward sections of pipelines until the full pipeline cross section at the bottom of the slope becomes blocked with liquid components, forming a 'terrain-induced slug'.

In addition, a multi-phase flow will form an equilibrium between liquid and gaseous components for a particular flow rate. The liquid component of the flow will have a lower velocity than the gaseous component and therefore a longer residence time in the pipeline. A particular level of liquid or "hold-up" is therefore established in the pipeline. An increase in multi-phase flow, such as when additional well-head manifolds are being brought on-line, will lead to the formation of a new equilibrium between the gaseous and liquid components. The level of hold-up in the pipeline will decrease towards a new equilibrium level, generating surges of liquid, known as 'flow-induced slugs' in the process.

As a result of slug formation, surges of components of the multi-phase or mixture flow (e.g. gas or liquid) may occur at any given point along the transmission pipeline, impeding efficient multi-phase or mixture flow and causing increased stresses on mechanical devices of the transmission system.

However, slugs are frequently composed of valuable liquid hydrocarbons, and it is economically desirable to have these hydrocarbons available for processing. Consequently facilities for receiving and treating a slug may be present near the downstream end of a pipeline. One such facility is a 'slug-catcher' which can provide a separation of the gas and liquid components of the multi-phase flow before further treatment. The volume of the slug catcher is conventionally dimensioned to collect the largest anticipated slug size.

Pipeline inspection and maintenance may induce unusually large volumes of fluid. For example, a pipeline must be periodically cleaned to remove liquid such as partial condensate, and debris such as sand, which has accumulated in the pipeline. It is common to introduce "spheres" or "pigs" (hereinafter referred to as "pigs") into the pipeline to aid in accumulating the liquids and debris into masses, or 'pig-induced slugs', which can be pushed along the pipeline ahead of the pig, which is propelled by the flowing gas. The pigging of a pipeline is essential maintenance because it allows periodic inspection and maintenance of the pipeline. In some cases, pigging reduces liquid hold-up in the pipeline and therefore increases the pipeline's capacity for gas flow.

The pigging of a pipeline can produce slugs of significantly larger size than hydrodynamic-, terrain- or flow-induced slugs. This may exceed the handling capacity of the slug catcher and can lead to the tripping of downstream processing facilities. It is not always economic to simply increase the size the slug catcher to deal with pig-induced slugs because pig-induced slugs may be 4-5 times the volume of hydrodynamic-, terrain- or flow-induced slugs.

WO 03/067146 A1 discloses a subsea pipeline for multi-phase flow having an integrated slug-catcher, in which the pipeline has a branch line such that it contains at least one upstream and two downstream ends. The connection of the branch line to the subsea pipeline occurs at a low point of the subsea pipeline and the connection is downwards directed such that the branch line can transport in particular the liquid phase and act as slug-catcher.

WO 03/067146 requires the construction of a branch line to accommodate pig-induced slugs. The branch line extends from the point of connection with the pipeline to the downstream end which may be a considerable distance away at an installation on-shore, a platform at sea or a further pipeline. The construction of such a branch line to act as a slug-catcher involves a considerable capital expenditure, particularly when the branch line must be constructed on the sea bed or other hostile environment.

WO 2005/040670 A1 discloses a system and method for reducing liquid accumulation in one of two pipelines which convey a multiphase flow. The two pipelines are connected together in a production plant via an interconnecting line. A recirculation line can convey separated gas under pressure from a process plant into the first pipeline in order to increase the gas rate in the second pipeline via the interconnecting line.

SUMMARY OF THE INVENTION

In a first aspect, the present invention provides a method of accommodating a pig-slug mass in a first pipeline upstream of a first slugcatcher system comprising at least the steps of:
(a) passing a first multi-phase stream along a first pipeline and through a first slugcatcher system;
(b) passing a second multi-phase stream through a second pipeline and a second slugcatcher system;
(c) passing a first pig down the first pipeline to create a first pig-slug mass in the first pipeline; and
(d) passing at least a fraction of the first multi-phase stream upstream of the first pig-slug mass to the second pipeline along a crossover line.

In an embodiment, the total volume of the first pipeline between the crossover line and the first slugcatcher system plus the volume of the first slugcatcher system is the same or greater than the total volume of the first pig plus the first pig-slug mass.

In a further aspect, the present invention provides an apparatus for accommodating a pig-slug mass in a first pipeline upstream of a first slugcatcher system comprising:
(a) a first pipeline and downstream first slugcatcher system for passing a first multi-phase stream along the first pipeline and through the first slugcatcher system;
(b) a second pipeline and downstream second slugcatcher system for passing the second multi-phase stream through the second pipeline and the second slugcatcher system;
(c) a first pig launcher for passing a first pig down the first pipeline to create a first pig-slug mass in the first pipeline; and
(d) a crossover line connecting the first pipeling and the second pipeline for passing at least a fraction of the first multi-phase stream upstream of the first pig-slug mass to the second pipeline.

BRIEF DESCRIPTION OF THE DRAWINGS

Embodiments and examples of the present invention will now be described by way of example only with reference to the accompanying non-limiting drawings in which.

DETAILED DESCRIPTION OF THE INVENTION

For the purpose of this description, a single reference number will be assigned to a line as well as a stream carried in that line.

Figure 1:
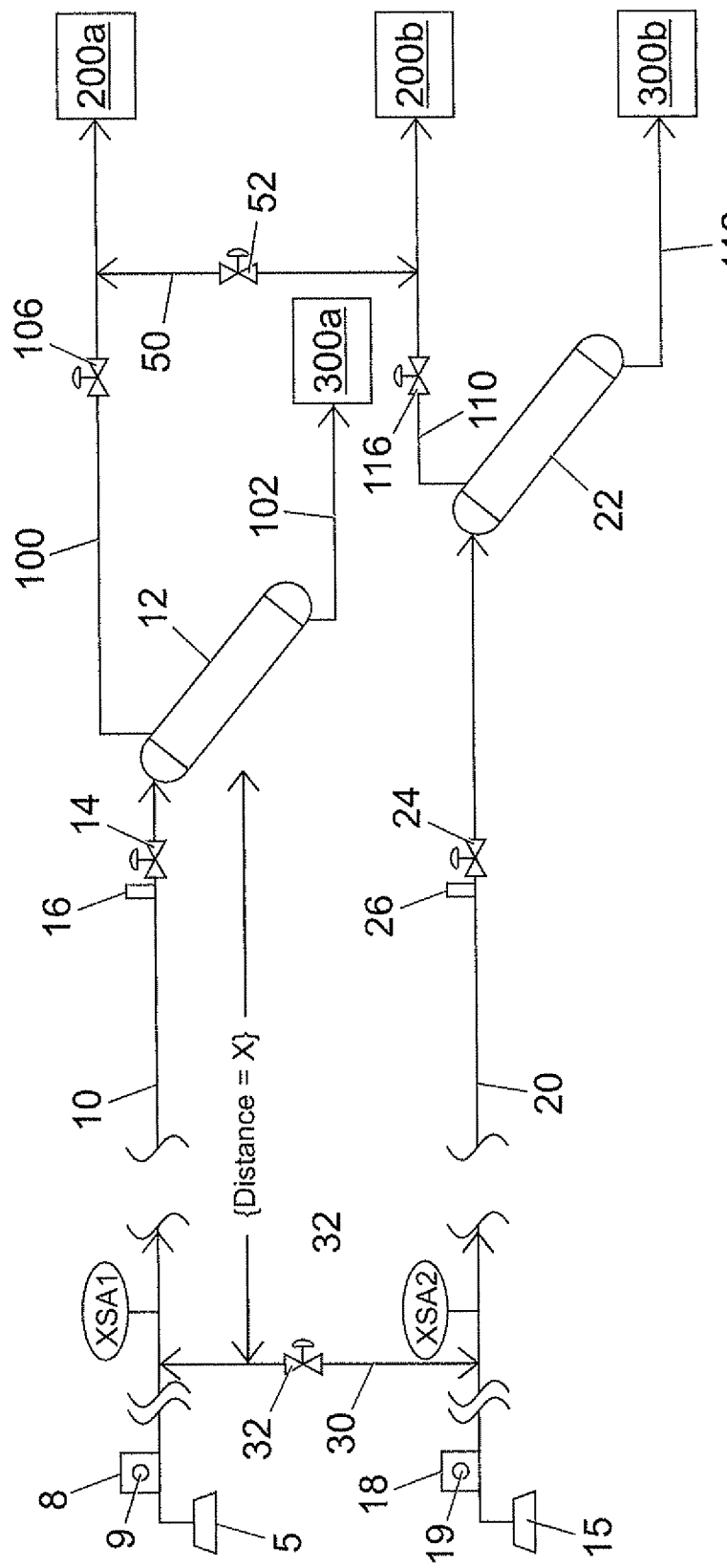
FIG. 1 is a diagrammatic scheme of a method of producing gaseous and liquid component streams from two multi-phase streams in at least two pipelines according to one embodiment of the invention.

In one embodiment, a method of producing gaseous and liquid component streams from at least two multi-phase streams in at least two pipelines is disclosed. FIG. 1 shows a schematic diagram including a first multi-phase stream 10, in a first pipeline 10, and a second multi-phase stream 20, in a second pipeline 20. The first and second pipelines both have at least one upstream end. The at least one first and at least one second upstream ends of the first and second pipelines may be connected to first and second well-head manifolds 5, 15 respectively of a natural gas field.

The first and second multi-phase streams 10, 20 may have the same or different compositions and may be hydrocarbon streams, such as streams comprising hydrocarbon gases, hydrocarbon liquids, water and solids including sand and trace amounts of corrosion products from the pipeline. For instance, the first and second multi-phase streams may be natural gas streams, for example streams transporting natural gas under high pressure from well-head manifolds 5, 15. The natural gas stream may comprise a number of valuable liquid and gaseous components. The liquid components may comprise natural gas liquids (NGLs) such as methane, ethane, propane and butanes, and liquid condensate comprising C5+ hydrocarbons. The gaseous components may comprise predominantly methane (e.g. >80 mol %) with the remainder being ethane, nitrogen, carbon dioxide and other trace gasses. The liquid and gaseous components can be treated to provide natural gas liquids, natural gas, and liquefied natural gas.

As already discussed, the transmission of multi-phase streams, such as natural gas in pipelines, particularly when transported on-shore from an off-shore site under high pressure, can lead to the accumulation of the liquid phase slugs in the pipelines. The accumulated liquid slugs can cause problems when the liquid slug enters a compressor or pump or is passed to a gas-processing facility wherein one or more of the components of the multi-phase stream are to be separated or otherwise treated.

In order to mitigate the problems associated with slug formation, first and second slug catcher systems 12, 22 are provided at the first and second downstream ends of the first and second pipelines 10, 20 respectively. Slug catcher systems are well known in the art in connection with the separation of the liquid and gaseous components from multi-phase streams.

The first and second slugcatcher systems include first and second separation vessels 12, 22 respectively. Gaseous components in the multi-phase streams 10, 20 are disengaged from the liquid components and move upwardly through the first and second separation vessels 12, 22 to exit overhead as first and second gaseous component streams 100, 110 respectively. In the embodiment shown, first and second gaseous component streams 100, 110 are connected to first and second gaseous processing facilities 200a, 200b respectively.

The liquid components of the first and second multi-phase streams 10, 20 move downwardly through the first and second separation vessels 12, 22 to exit through a bottom portion of the separation vessels as at least one first and at least one second liquid component streams 102, 112 respectively. First and second liquid component streams 102, 112 may be connected to first and second liquid processing facilities 300a, 300b respectively, where they can be treated to provide a stabilised condensate stream by the removal of the volatile components by processes known in the art. Such stabilised condensate streams may comprise C5+ hydrocarbons, and preferably have a vapour pressure of about 10 psi.

A crossover line 30 connects the first and second pipelines 10, 20 upstream of the first and second slugcatcher systems 12, 22. The connection of the crossover line 30 to the first and second pipelines 10, can be achieved in a conventional manner, such as via a barred or sphere tee. Crossover line 30 contains a crossover valve 32. The selective opening of crossover valve 32 can allow at least a fraction of the first multi-phase stream 10 to pass along crossover line 30 to second pipeline 20 and on to the second slugcatcher system 22. This procedure may be accompanied by a reduction in the flow along the first pipeline downstream of crossover line 30. The reduction in flow may be achieved by at least partially closing first pipeline valve 14, or by closing first gaseous component stream valve 106 as discussed later. Crossover line 30 can selectively pass a part or all of the first multi-phase stream 10 from the first pipeline 10 to the second pipeline 20, for instance when first pipeline valve 14 is closed and crossover valve 32 is opened.

Similarly, the selective opening of crossover valve 32 can allow at least a fraction of the second multi-phase stream 20 to pass along crossover line 30 to first pipeline 10 and on to the first slugcatcher system 12. This procedure may be accompanied by a reduction in the flow along the second pipeline downstream of crossover line 30. The reduction in flow may be achieved by at least partially closing second pipeline valve 24 or closing second gaseous component stream valve 116. Crossover line 30 can selectively pass a part or all of the second multi-phase stream 20 from the second pipeline 20 to the first pipeline 10, for instance when second pipeline valve 24 is closed and crossover valve 32 is opened.

In this way, it is possible to redirect some or all of the first multi-phase stream 10 from the first pipeline 10 to the second pipeline 20 via crossover line 30, or vice-versa. The capability to redirect the multi-phase stream from the first or second pipelines 10, 20 to the second or first pipelines 20, 10 respectively allows the first or second slugcatcher systems 12, 22 to be taken off-line for maintenance.

In a further embodiment (not shown), an optional second crossover line containing a second crossover valve may be present between the first and second pipelines 10, 20. The second crossover line can be connected to the first pipeline 10 between first pig receiver 16 and first pipeline valve 14. The second crossover line can be connected to the second pipeline 20 between the second pig receiver 26 and second pipeline valve 24. The provision of a second crossover line allows the first multi-phase stream 10 to be diverted to the second slug-catcher system 22 when first pipeline valve 14 is closed and the second crossover valve is opened. Similarly, the second multi-phase stream 20 can be diverted to the first slugcatcher system 12 along the second crossover line when the second pipeline valve 24 is closed and the second crossover valve is opened. The second crossover line prevents one or other of the first or second pipelines 10, 20 from becoming filled with fluid downstream of the first crossover line 30 when one or other of the first or second pipeline valves 14, 24 respectively is closed.

The first and second gaseous component streams 102, 112 from slugcatcher systems 12, 22 can be selectively combined downstream of the slugcatchers, for instance by gaseous stream crossover line 50 by opening gaseous stream crossover valve 52. This allows the redirection of at least a fraction of the first or second gaseous streams 100, 110 to the second or first gaseous lines 110, 100 respectively, for instance should one or other of the slugcatcher systems require bypassing. In this way, it is possible to maintain a supply of first and second gaseous component streams 100, 110 to both processing facilities 200a, 200b, even if one of the first and second slugcatcher systems 12, 22 is bypassed.

The first and second slugcatcher systems 12, 22 should be sized to handle hydrodynamic-, terrain- and flow-induced slugs from the first and second pipelines 10, 20 respectively. The first and second slugcatcher systems 12, 22 are thus of an appropriate capacity to handle the combined gas flow of the first and second multi-phase streams, and the relatively small slugs associated with hydrodynamic-, terrain- and flow-induced effects.

Periodic maintenance of the first and second pipelines 10, 20 can be carried out by pigging one or other of the first or second pipelines 10, 20. A first or second pig 9, 19 can be introduced into one or other of the first and second pipelines 10, 20 at first or second pig launchers 8, 18 respectively. The first and second pigs 9, 19 can be captured by first and second pig receivers 16, 26 respectively. The pigging operation aids in the accumulation of liquid deposits in the pipelines and the removal of the slug masses.

A pigging operation can generate unusually large slugs of liquid, which are significantly greater in mass than hydrodynamic-, terrain- and flow-induced slugs. Conventionally, slugcatcher systems are sized to handle such large pig-induced slugs. This requires a very large slugcatcher system, incurring significant capital expenditure. However, one advantage of the method and apparatus disclosed herein is that the first and second slugcatcher systems do not have to be sized to accommodate pig-induced slugs from the first and second pipelines 10, 20.

Taking the pigging of the first pipeline 10 as an example, first pig 9 is introduced into first pipeline 10 from first pig launcher 8. The first pig 9 is propelled along the first pipeline 10 by the multi-phase flow, accumulating liquids in the pipeline and pushing the liquids ahead of the pig as slugs in the direction of flow.

When the first pig 9 has passed the crossover line 30, its presence downstream of the crossover line 30 is detected by first pig signaller XSA1, which is situated downstream of crossover line 30, in first pipeline 10 between the crossover line 30 and the first slugcatcher system 12. The pig signaller XSA1 may be an intrusive signaller, such as a lever or a plunger which intrudes into the first pipeline 10, or may be a non-intrusive signaller, which can remotely sense the pig's presence from outside the pipe wall, for example by a change in the magnetic field if the pig is equipped with a magnet.

Crossover valve 32 will be opened in response to a signal from first pig signaller XSA1 when it has detected the first pig 9, allowing the first multi-phase stream 10 to pass through crossover line 30 and into the second pipeline 20. Because the first pipeline 10 has been recently pigged, removing any liquid deposits, and the first pig-slug mass is downstream of the crossover line 30, the second slugcatcher system 22 is only required to be sized for the full gas flow of the first and second pipelines 10, 20, but not the combined liquid flow. The requirement for the second slugcatcher system 22 to handle the combined gas flow has only a small effect on cost compared to the liquid storage requirements, and a smaller slugcatcher system can be used.

The second slugcatcher system 22 can therefore process the combined first and second multi-phase streams arriving through the second pipeline 20. A portion of the second gaseous component stream 110 produced by the second slugcatcher system 22 can be redirected along gaseous crossover line 50 to the first gaseous component line 100 such that the supply of gas to the first processing facility 200a can be maintained.

The crossover line 30 must be located far enough upstream of the first slugcatcher system 12 to ensure that the entire first pig-slug mass and first pig 9 can be accommodated in the first pipeline 10 downstream of crossover line 30 and in the first slugcatcher system 12.

For instance, the distance between the crossover line 30 to the first slugcatcher system (shown in FIG. 1 as distance X) could be up to 10 km, more preferably in the range of 2 to 8 km. The greater the distance between the crossover line 30 and the first slugcatcher system 12, the greater the reliance upon the second pipeline 20. This is because the second pipeline must carry the combined first and second multi-phase streams downstream of the crossover line 30 when a pig-slug is present in the first pipeline 10 downstream of crossover line 30 and in the first slugcatcher system 12.

Figure 2:
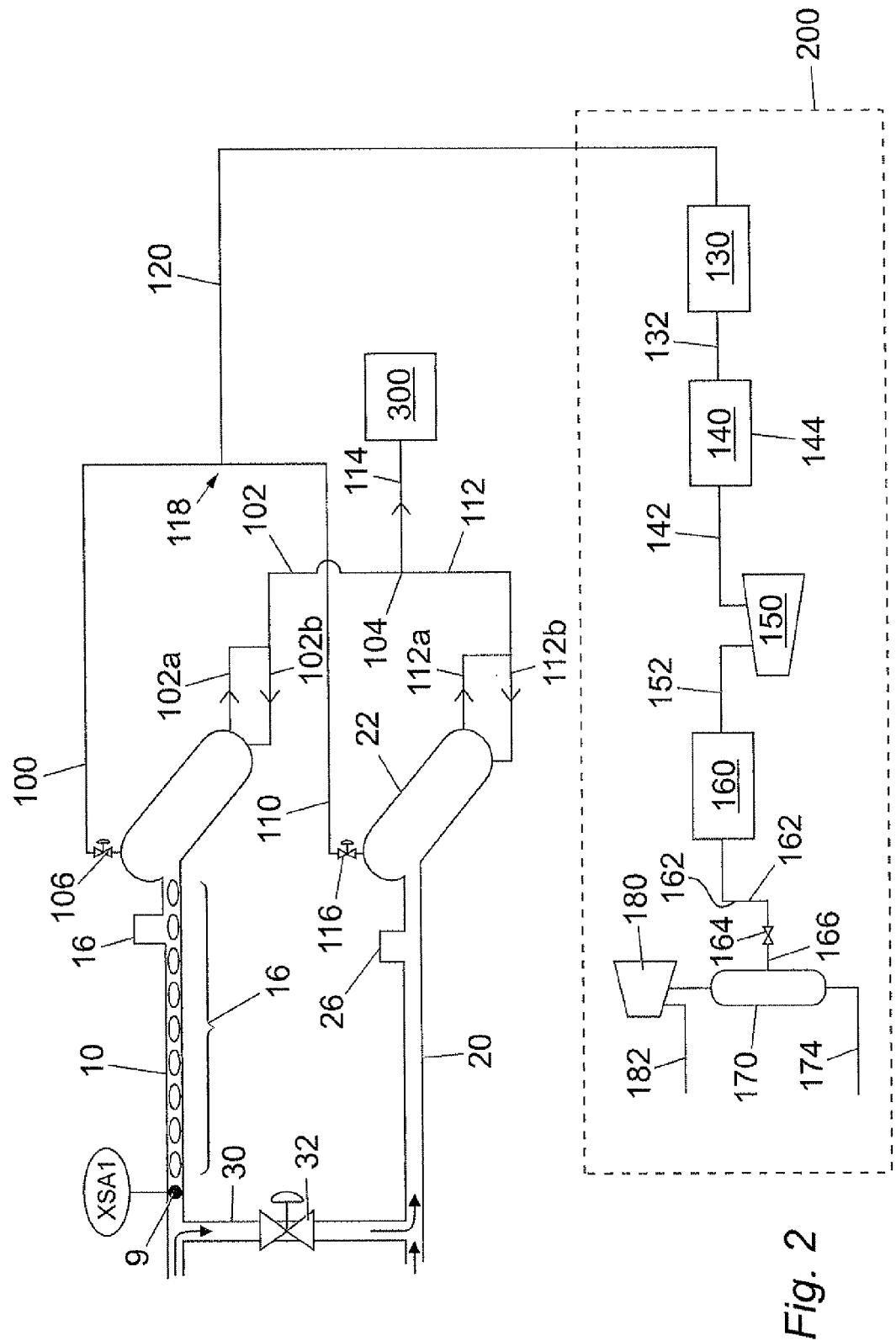
FIG. 2 is a diagrammatic scheme of a method of producing gaseous and liquid component streams from two multi-phase streams in at least two pipelines and their further processing according to another embodiment of the invention.

FIG. 2 shows a magnified version of the first and second pipelines 10, 20, near crossover line 30. First pig 9 and first pig-slug mass 16 are shown downstream of crossover line 30, with the first multi-phase stream being redirected along the second pipeline 20 via crossover line 30.

Preferably, the total volume of the first pipeline 10 between the crossover line 30 and the first slugcatcher system 12 plus the volume of the first slugcatcher system 12 should be greater than the total volume of the first pig 9 plus first pig-slug mass 16. More preferably, the volume of the first pipeline 10 between the crossover line 30 and the first slugcatcher system 12 should be greater than the total volume of the first pig 9 plus first pig-slug mass 16.

The high liquid level in the first separation vessel of the first slugcatcher system 12 caused by the arrival of the first pig-slug mass 16 will cause the first gaseous component stream valve 106 to close. This will reduce the velocity of the fluid in the pigged first pipeline 10 downstream of crossover line 30. This process allows the liquid level in the first separation vessel of the first slugcatcher system 12 to remain constant while the downstream liquid processing facility 300 processes the first liquid component stream 102.

Once the first pig-slug mass 16 has been processed by the first slugcatcher system 12, the liquid level within the first separation vessel will drop, returning to normal levels. First gaseous stream valve 106 can then be reopened and first pig 9 can be captured by first pig receiver 16 as it nears the first slugcatcher system 12. Crossover line valve 32 can then be closed and the first multi-phase stream 10 returned to its normal path along pipeline 10 downstream of crossover line 30 to first slugcatcher system 12.

It will be apparent that maintenance of the second pipeline 20 can be carried out by pigging in a similar manner to that described above. The second multi-phase stream can be diverted along the crossover line 30 to the first pipeline 10 when the second pig 19 has passed the second pig signaller XSA2 downstream of the crossover line 30, between the crossover line 30 and the second slugcatcher system 22. The second pig-slug mass accommodated in the second pipeline 20 downstream of the crossover line 30 can then be processed by the second slugcatcher system 22 while the first and second multi-phase streams are processed by the first slugcatcher system 10.

In this way, the requirement for a large slugcatcher system is avoided by storing the pig generated slug in one of the pipelines downstream of the crossover line 30. The provision of a crossover connection allows the replacement of a large slugcatcher with two smaller slugcatchers, with the large pig-induced slug of liquid being retained in the pipeline awaiting processing by the slugcatcher system. The sizes of the first and second slugcatcher systems are significantly reduced because they require smaller liquid storage capacities. This configuration allows full production of the gas processing facilities to be maintained and provides significant capital expenditure savings by eliminating the requirement for a large slugcatcher system. A further advantage is the reduction of the risks associated with containing large inventories of high pressure hydrocarbons in the downstream processing facilities.

In a further embodiment, the first and second gaseous component streams 100, 110 can be passed to a processing facility 200 for further treatment, such as one or more treatments selected from the group comprising: acid gas removal, natural gas liquids (NGL) extraction and cooling, particularly liquefaction.

As shown in FIG. 2, first and second gaseous component streams 100, 110 may be combined at junction 118 to provide a combined gaseous component stream 120, which is passed to gaseous processing facility 200. In an alternative embodiment which is not shown, the first and second gaseous component streams 100, 110 could remain separate and could be passed to different processing trains in the same processing facility, or to different processing facilities.

Gaseous component processing facility 200 can treat any suitable combined gaseous component streams 120 obtained from the first and second gaseous component streams 100, 110 such as, but not limited to, a hydrocarbon stream, particularly a natural gas stream obtained from a natural gas or petroleum reservoir.

Usually the combined gaseous component stream 120 is comprised substantially of methane. Preferably the combined gaseous component stream comprises at least 50 mol % methane, more preferably at least 80 mol % methane. Depending on the source, the combined gaseous component stream 120 may contain one or more non-hydrocarbons such as $H_2O$, $N_2$, $CO_2$, Hg, $H_2S$ and other sulfur compounds.

If desired, the combined gaseous component stream 120 may be pre-treated in pre-treatment unit 130, either as part of a hydrocarbon cooling process, or separately to provide treated gaseous component stream 132. This pre-treatment may comprise reduction and/or removal of non-hydrocarbons such as so-called acid gasses $CO_2$ and $H_2S$ or other steps such as early cooling and pre-pressurizing. As these steps are well known to the person skilled in the art, their mechanisms are not further discussed here.

Preferably, the combined gaseous component stream 120 used herein undergoes at least the minimum pre-treatment required to subsequently allow liquefaction of the gaseous component stream. Such a requirement for liquefying natural gas is known in the art.

A hydrocarbon gaseous component stream commonly also contains varying amounts of hydrocarbons heavier than methane such as ethane, propane, butanes and pentanes, as well as some aromatic hydrocarbons. The composition varies depending upon the type and location of the gaseous component stream such as natural gas.

Hydrocarbons heavier than methane generally need to be removed from natural gas to be liquefied for several reasons, such as having different freezing or liquefaction temperatures that may cause them to block parts of a methane liquefaction plant. C2-4 hydrocarbons can be used as a source of natural gas liquids (NGLs) and/or refrigerant.

The treated gaseous stream 132 may be provided as a low pressure stream ready for passing into an NGL recovery column as part of the NGL recovery system 140. Alternatively and/or additionally, the NGL recovery system 140 may include at least a first expander (not shown) able to expand the treated gaseous stream 132 to provide a mixed-phase stream for the NGL recovery column.

The NGL recovery system 140 provides a methane-enriched overhead stream 142 and a C2+ enriched bottom stream 144, such as an NGL stream in a manner known in the art. The C2+ enriched bottom stream can pass to one or more separators such as one or more distillation columns or a fractionation column, to provide individual hydrocarbon streams such as an ethane stream, a propane stream and a butanes stream, or a combination of the same, either for separate use, or for at least partial use as one or more of the components of one or more of the refrigerants of the liquefaction unit described below.

The methane-enriched overhead stream 142 may still comprise a minor (<10 mol %) amount of C2+ hydrocarbons, and is preferably >80 mol %, more preferably >90 mol %, methane and nitrogen.

The methane-enriched overhead stream 142 can be passed through a first compressor 150 to provide a methane-compressed stream 152. The first compressor 150 may comprise one or more compressors, stages and/or sections in a manner known in the art.

The methane-compressed stream 152 can then be liquefied to provide a first liquefied stream 162. Liquefaction of the methane-compressed stream 152 can be carried out by one or more cooling stages comprising one or more heat exchangers. FIG. 2 shows by way of example a liquefaction system 160, such as a 'main' cooling stage, able to cool the methane-compressed stream 152 to a temperature of at least −100° C.

The pressure of the first liquefied stream 162 is then reduced to provide a final mixed-phase stream 166. Reduction in the pressure of a liquefied stream may be carried out by any suitable apparatus, unit or device known in the art, such as an expansion device 164, including one or more valves and/or one or more expanders. FIG. 2 shows the example of using a valve 164.

The final mixed-phase stream 166 is then passed into an end gas/liquid separator 170, such as an end-flash vessel known in the art, to provide a liquefied hydrocarbon product stream 174, and an end gaseous stream 172, such as an end-flash gas. The liquefied hydrocarbon product stream 174 can then be passed by one or more pumps (not shown) to storage and/or transportation facilities. Where the combined gaseous stream 120 is natural gas, the liquefied hydrocarbon product stream 174 is LNG.

The end gaseous stream 172, such as end-flash gas, from the end gas/liquid separator 170 can then pass through one or more end-compressors 180 to provide an end-compressed stream 182, such as a natural gas stream. The end-compressor(s) 180 may be any suitable compressor(s) having one or more stages and/or sections known in the art. The end-compressed stream 182 may also be used for one or more purposes such as in one or more heat exchangers or as a fuel stream, and may provide one or more other fractions for other uses. Other uses for an end-compressed stream 182 are known in the art.

In a further embodiment shown in FIG. 2, the first and second slugcatcher systems 12, 22 may provide additional separation of the first and second multi-phase streams 10, 20. Two first liquid streams 102a, 102b and two second liquid streams 112a, 112b can exit the bottom portions of the first and second separation vessels 12, 22. For instance, upper first and second liquid streams 102a, 112a may be partially stabilised condensate streams, while lower first and second liquid streams 102b, 112b may be water streams. The upper and lower first and second liquid component streams may be combined into first and second liquid component streams 102, 112 respectively. The first and second liquid component streams may then be further combined at junction 104 and passed to liquid processing facility 300 along combined liquid stream 113. Liquid processing facility 300 may be a condensate/stabilisation/treatment plant which can provide stabilised condensate.

The person skilled in the art will understand that the present invention can be carried out in many various ways without departing from the scope of the appended claims.

What is claimed is:

1. A method of accommodating a pig-slug mass in a first pipeline upstream of a first slugcatcher system comprising the steps of:
   (a) passing a first multi-phase stream along, a first pipeline and through a first slugcatcher system arranged to provide a first gaseous component stream and at least one first liquid component stream:
   (b) passing a second multi-phase stream through a second pipeline and a second slugcatcher system arranged to provide a second gaseous component stream and at least one second liquid component stream;
   (c) passing a first pig down the first pipeline to create a first pig-slug mass in the first pipeline;
   (d) passing at least a fraction of the first multi-phase stream upstream of the first pig-slug mass to the second pipeline along a crossover line; and
   (e) selectively combining the first gaseous component stream and the second gaseous component stream downstream of the first and second slugcatcher systems;
   (f) treating one or both of the first and second gaseous component streams to provide one or more gaseous component streams selected from the group consisting of natural gas liquids, natural gas and LNG, the treating comprising:
      (i) passing one or both of the first and second gaseous component streams to an NGL recovery system to provide an NGL stream and a methane-enriched overhead stream;
      (ii) compressing the methane-enriched overhead stream in one or more compressors to provide a methane-compressed stream;
      (iii) liquefying the methane-compressed stream in a liquefaction system to provide a first liquefied stream;
      (iv) expanding the first liquefied stream in an expansion device to provide a final mixed-phase stream; and
      (v) separating the final mixed-phase stream in an end gas/liquid separator to provide a LNG stream, and an end gaseous stream.

2. A method as claimed in claim 1 wherein the crossover line is opened when the first pig is downstream of the crossover line.

3. A method as claimed in claim 1 wherein the first pipeline comprises a first pig signaller between the crossover line and the first slugcatcher system, and the crossover line is opened when the first pig signaller detects the first pig.

4. A method as claimed in claim 1, wherein the volume of the first pipeline between the crossover line and the first slugcatcher system is the same or greater than the volume of the first pig-slug mass in the first pipeline.

5. A method as claimed in claim 1, wherein the total volume of the first pipeline between the crossover line and the first slugcatcher system plus the volume of the first slugcatcher system is the same or greater than the total volume of the first pig plus the first pig-slug mass.

6. A method as claimed in claim 1, wherein the volume of the first pipeline between the crossover line and the first slugcatcher system is the same or greater than the total volume of the first pig plus the first pig-slug mass.

7. A method as claimed in claim 1 further comprising the steps of:
(g) selectively opening the crossover line between the first pipeline and the second pipeline upstream of the first and second slugcatcher systems to pass at least a fraction of the first multi-phase stream through the second pipeline and the second slugcatcher system; and
(h) reducing, the flow of the first multi-phase stream along the first pipeline downstream of the crossover line during step(g).

8. A method as claimed in claim 1 wherein the crossover pipeline selectively passes all of the first multi-phase stream from the first pipeline to the second pipeline.

9. An apparatus for accommodating a pig-slug mass in a first pipeline upstream of a first slugcatcher system, comprising:
(a) a first pipeline and downstream first slugcatcher system for passing a first multi-phase stream along the first pipeline and through the first slugcatcher system arranged to provide a first gaseous component stream and at least one first liquid component stream;
(b) a second pipeline and downstream second slugcatcher system for passing the second multi-phase stream through the second pipeline and the second slugcatcher system arranged to provide a second gaseous component stream and at least one second liquid component stream;
(c) a first pig launcher for passing a first pig down the first pipeline to create a first pig-slug mass in the first pipeline;
(d) a crossover line connecting the first pipeline and the second pipeline for passing at least a fraction of the first multi-phase stream upstream of the first pig-slug mass to the second pipeline;
(e) a junction and/or a gaseous stream crossover line for selectively combining the first gaseous component stream and the second gaseous component stream downstream of the first and second slugcatcher systems; and
(f) a processing facility for treating one or both of the first and second gaseous component streams to provide one or more gaseous component streams selected from the group consisting of natural gas liquids, natural gas and LNG, the processing facility comprising;
(i) an NGL recovery system to provide an NGL stream and a methane-enriched overhead stream from one or both of the first and second gaseous component streams;
(ii) one or more compressors to compress the methane-enriched overhead stream to provide a methane-compressed stream;
(iii) a liquefaction system to liquefy the methane-compressed stream to provide a first liquefied stream;
(iv) an expansion device to expand the first liquefied stream to provide a final mixed-phase stream; and
(v) an end gas/liquid separator to separate the final mixed-phase stream to provide a LNG stream and an end gaseous stream.

10. The apparatus as claimed in claim 9 wherein the first pipeline comprises a first pig signaller between the crossover line and the first slugcatcher system.

11. The apparatus as claimed in claim 9 wherein the volume of the first pipeline between the crossover line and the first slugcatcher system is the same or greater than the volume of the first pig-slug mass in the first pipeline.

12. The apparatus as claimed in claim 9, wherein the total volume of the first pipeline between the crossover line and the first slugcatcher system plus the volume of the first slugcatcher system is the same or greater than the total volume of the first pig plus the first pig-slug mass.

* * * * *